May 6, 1958      R. A. STURLEY      2,833,125

EVAPORATOR FEED CONTROL

Filed April 1, 1954      2 Sheets-Sheet 1

INVENTOR.
Richard A. Sturley
BY Herman Said
Atty.

May 6, 1958 R. A. STURLEY 2,833,125
EVAPORATOR FEED CONTROL
Filed April 1, 1954 2 Sheets-Sheet 2
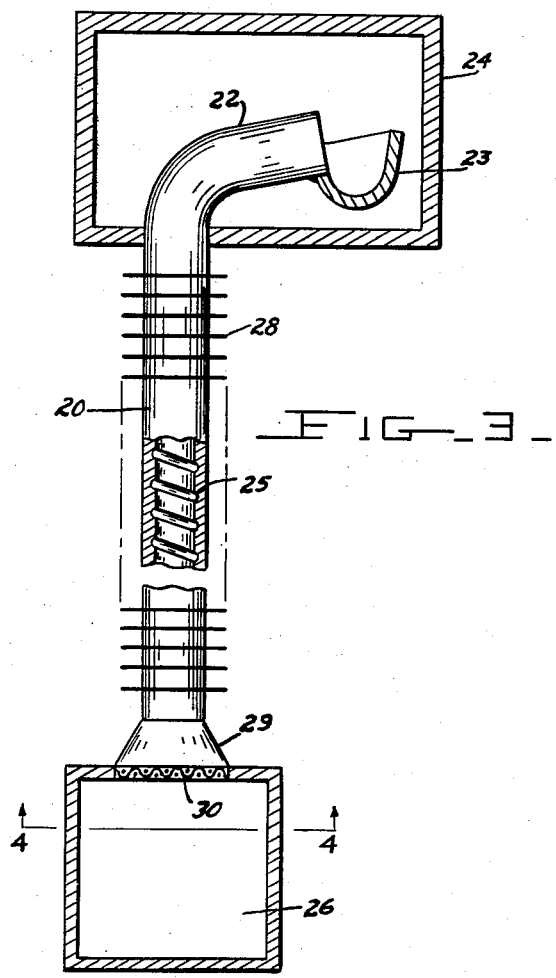
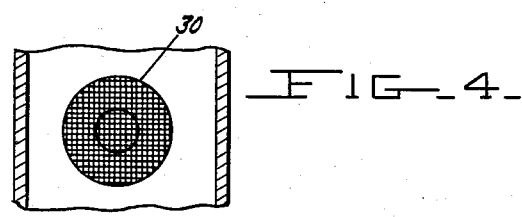
INVENTOR.
Richard A. Sturley
BY Herman Seid
Atty.

United States Patent Office 2,833,125
Patented May 6, 1958

2,833,125
EVAPORATOR FEED CONTROL

Richard A. Sturley, Kirkville, N. Y., assignor to Carrier Corporation, Syracuse, N. Y., a corporation of Delaware Application April 1, 1954, Serial No. 420,329

9 Claims. (Cl. 62—119)

This invention relates broadly to the control of the flow of liquids and more specifically to the control of liquid flow involving relatively small quantities of liquid. Still more specifically the invention is concerned with a control for the flow of liquid refrigerant for an evaporator of an absorption refrigertion system.

In some absorption refrigeration systems, for example those having about a 5 ton capacity, relatively small quantities of liquid refrigerant, of the order of a pint of refrigerant per minute more or less, are introduced into the evaporator which is in heat exchange relation with a medium such as air to be cooled. The inner surface of the evaporator, which is usually in the form of one or more tubes, may be provided with a series of spaced circumferential grooves designed to accommodate the flow of the liquid refrigerant and distribute it in film form over the inner surface of the tube. As the liquid refrigerant evaporates the vapor flows from the tube, with a portion thereof escaping through the opening by which the liquid refrigerant enters the evaporator. It is an object of this invention to provide an arrangement for varying the rate of vapor discharge in counterflow relation to the introduction of the liquid refrigerant into the evaporator, the vapor flow acting to resist the liquid flow and so regulate its introduction into the evaporator.

It is a further object of the invention to provide a control as described, responsive to the presence of unvaporized liquid refrigerant, proximate the end of the evaporator remote from the end through which the liquid refrigerant is introduced into the evaporator.

A still further object of the invention is the provision of an arrangement controlling the supply of liquid refrigerant to a heat exchange unit such as an evaporator that utilizes a vapor block regulated by portions of unvaporized liquid within the evaporator.

Other objects and advantages of the invention will be apparent from a consideration of the ensuing specification and drawings in which;

Figure 3 is a view in elevation of a modification of the evaporator shown in Figure 2; and Figure 4 is a bottom plan view of one of the evaporator tubes showing the liquid collecting memebr of the invention.

Figure 1:
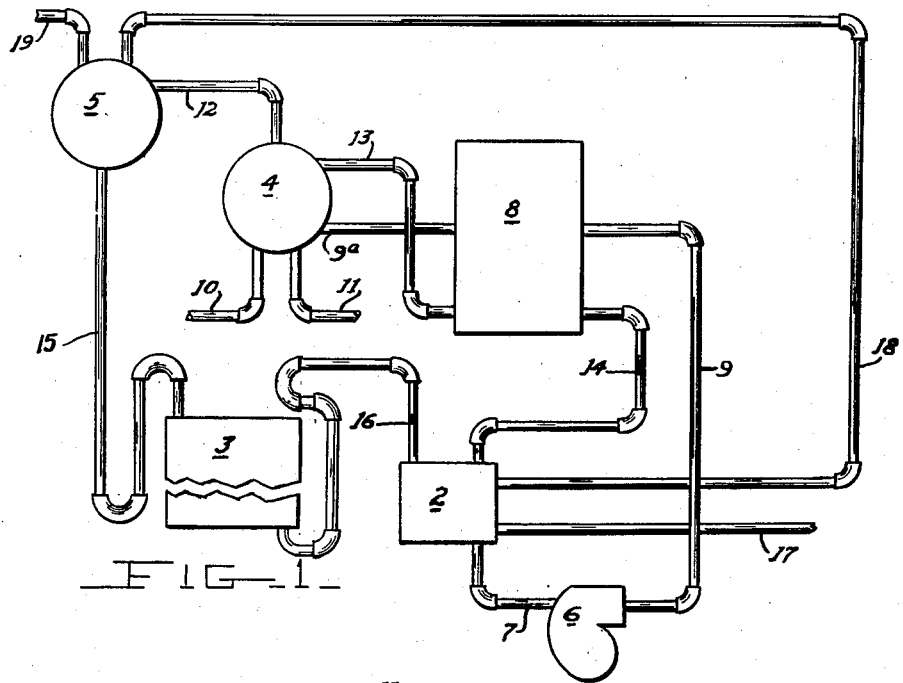
Figure 1 is a schematic view of an absorption refrigeration system of the type to which the invention may be applied.

Referring to the drawings which illustrate one embodiment of the invention, there is shown in Figure 1 an absorption refrigeration system utilizing water as a refrigerant and including an absorber 2, an evaporator 3, a generator 4, and a condenser 5. A pump 6 receives weak solution consisting of water and an absorbent such as a lithium bromide solution from the absorber 2 through line 7 and feeds it to a heat exchanger 8 through line 9. The term "weak solution" is used to designate a solution rich in refrigerant so as to be weak in absorbing properties while the term "strong solution" is used to designate solution deficient in refrigerant so as to possess strong absorbing properties. From the heat exchanger 8 the weak solution passes to the generator 4 through line 9 where it is heated by a gas burner (not shown).

In the generator some of the water in the weak solution is vaporized with the vapor passing through line 12 to the condenser 5 where it is condensed by being placed in heat evchange relation with any suitable cooling medium. The strong solution remaining in the generator flows through line 13 to the heat exchanger where it serves to warm the weak solution about to enter the generator. After passage through the heat exchanger the strong solution enters the absorber 2 through line 14. Meanwhile the condensate proceeds from condenser 5, via line 15 to the evaporator 3 of the system. To maintain the necessary pressure differential between the condenser and evaporator and line 15 is looped to insure a pressure seal in the form of a liquid column. Other arrangements for maintaining the pressure differential will suggest themselves, for example, line 15 may be provided with a conventional restriction and directly connect the condenser 5 and the evaporator 3.

In the evaporator the refrigerant is evaporated by absorbing heat from a medium to be cooled such as air passed in heat exchange relation therewith. The vaporized refrigerant then passes from the evaporator through line 16 to the absorber where it is condensed and absorbed by the strong solution thereby completing the refrigeration cycle.

A circuit for the condenser and absorber cooling water is shown consisting of inlet line 17, an absorber coil (not shown) connecting line 18, a condenser coil (not shown) and outlet line 19. A cooling device such as a cooling tower or the like may receive the cooling water from line 19 and return it through line 17 to complete this circuit.

Figure 2:
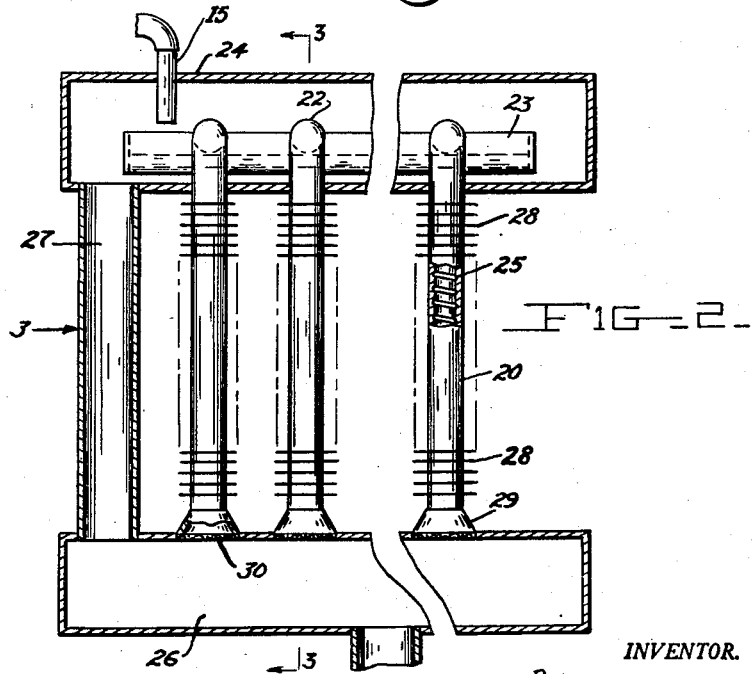
Figure 2 is a fragmentary sectional view of the evaporator of the system shown in Figure 1.

Referring more particularly to Figures 2 and 3 there is shown, in detail, an evaporator 3, provided with an improved refrigerant feed control arrangement of the type contemplated by the invention. The evaporator 3 includes a plurality of hollow tubes 20, each having a vertical portion 21 and an angular portion 22 integral therewith. Liquid refrigerant is introduced into the end of the angular portion 22 of tube 20 from a receiver 23 in the form of a trough disposed in an upper vapor header 24. The trough in turn is supplied with liquid refrigerant from line 15. The liquid refrigerant gravitates downwardly through the tubes in the form of a film. Circumferential grooves 25 placed on the inner or liquid refrigerant engaging side of the tubes 20 assist in distributing the film of liquid over the inner surface of the tube between the grooves. The lower ends of the tubes 20 are in communication with a lower vapor header 26, having an outlet in registry with line 16 through which the vapor flows to the absorber. A bypass line 27 connects the upper and lower vapor headers. The tubes 20 are further provided with a series of fins 28 designed to permit more efficient heat exchange action between the refrigerant and the medium (air) to be cooled. The lower end of each tube is preferably provided with a flared portion 29, see Figure 3, defining a generally bell-mouthed extremity at the connection of the tube and the lower vapor header. Disposed across the opening at the lower end of the tube is a screen 30 or the like, acting as a partial restriction.

Considering the operation of the improved control device, it will be understood that the basic evaporator structure has been designed in the manner disclosed in co-pending application 368,355, filed July 16, 1953 in the name of E. P. Palmatier, to achieve maximum efficiency. To this end the inclination of the angular portions 22 of the tubes 20 has been predetermined so as to permit, under the normal predetermined load conditions, the rate of flow of the liquid refrigerant through the tubes to be such that the inner surface of the tube will be wetted downwardly to a desired level spaced from the lower end of the tube before the evaporation of the liquid refrigerant becomes complete. The vapor produced within the evaporator tubes escapes into both the upper and lower vapor headers.

Considering for the moment the effect of a reduced demand upon the evaporator, it will be obvious that under a constant rate of flow the level to which the inner surface is wetted will be lowered due to the decreased rate of evaporation. In the event the level drops to the lower extremity of the tube 20 then the screen acts in the manner of a collecting member restricting or preventing flow of the unvaporized liquid refrigerant into the lower vapor header while simultaneously creating a vapor block at the lower end of the tube so that a greater volume of vapor is placed in counterflow relation to the liquid refrigerant entering the tube. This action serves to reduce the flow of liquid refrigerant in the tubes permitting the liquid refrigerant in the tubes to become vaporized and a balance between the load, as evidenced by the rate of evaporation, and the feed of the liquid refrigerant into the evaporator tube, to be obtained. It will be obvious that this action may occur in either a single tube or a plurality of tubes.

The problem of preventing the flow of unvaporized refrigerant into the lower vapor header does not occur under circumstances involving a load in excess of the design load such as encountered when the system is started because of the consequent increase in the rate of evaporation of the refrigerant.

The screen 30 is effective for its intended purpose because of the nature of the liquid flow within the tubes. As pointed out above the parts are so arranged and constructed that the liquid is essentially in film form as it passes through the tube 20. Thus as unvaporized liquid refrigerant reaches the screen 30, the film of liquid bridges the openings in the screen formed by the intermeshed wires. This action causes the flow of vapor through the lower end of the tube to be obstructed as pointed out above. The relationship between the flow of liquid refrigerant and the counterflow of vapor at the top of the tube tends to maintain a balance as the load on the evaporator is stabilized.

It will be apparent that I have devised an improved control for the supply of liquid refrigerant to an evaporator of an absorption refrigeration system that utilizes the particular flow characteristics of the liquid in a manner to promote a high degree of efficiency within the system. Further the arrangement disclosed permits the realization of an efficient control of the type described with a minimum of cost. In addition the particular screen or unvaporized refrigerant collecting member permits a wider variation in the angle of the portion 22 of the tube and eliminates the need for a precise positioning of the wetted surface level when the feed control is designed. Certain factors such as the temperature of the condenser coolant may vary within rather wide limits without affecting the original design. In other words the operation of the member 30 tends to overcome the effects of factors that defy fine control, resulting in a more precise control.

I claim:

1. In an absorption refrigeration system, an evaporator having a first opening for the introduction of liquid refrigerant into the evaporator and a second opening remote from said first opening, said openings permitting the passage of refrigerant in vapor form from the evaporator, means associated with said second opening, responsive to the presence of unvaporized refrigerant in the evaporator for obstructing the passage of vapor from the second opening thereby creating increased vapor flow through the first opening.

2. In an absorption refrigeration system, an evaporator tube, open at both ends, means for introducing liquid refrigerant into one end of the tube with the refrigerant in contact with the inner surface of the tube so that vaporized refrigerant is free to escape through the open ends of the tube, means, associated with the end of the tube remote from the end through which the liquid refrigerant is introduced, for accumulating unvaporized refrigerant to serve as an obstruction to the passage of vaporized refrigerant and increase the vapor flowing through the other opening in counterflow relation to the flow of liquid refrigerant.

3. The method of controlling the supply of liquid to a heat exchanger which consists of introducing the liquid into the heat exchanger through a first opening therein, providing a second opening in the heat exchanger spaced from said first opening, said openings serving to permit passage of the vapor from the heat exchanger, with the vapor passing through the first opening opposing the flow of liquid into the heat exchanger and varying the flow of vapor through the first opening by restricting the second opening with unvaporized liquid.

4. The method of controlling the supply of liquid refrigerant to an evaporator having at least one tube, provided with two openings, which consists of introducing liquid refrigerant into the evaporator through the first opening, partially blocking the second opening of the tube so that refrigerant vaporized in the evaporator flows through both openings, utilizing unvaporized refrigerant in the tube to vary the area of the partially blocked end of the tube available for passage of the vaporized refrigerant to vary, in turn, the amount of vaporized refrigerant flowing counter to the flow of liquid refrigerant into the tube.

5. In an absorption refrigeration system including in combination an absorber, an evaporator having at least one tube, a generator and a condenser in a closed circuit, a line leading from the absorber to the generator to carry weak solution, a second line leading from the generator to the absorber to carry strong solution, a third line leading from the condenser to the evaporator to carry liquid refrigerant, a fourth line leading from the evaporator to the absorber to carry vaporized refrigerant, means to supply liquid refrigerant to the tube, means to remove vaporized refrigerant from the tube at a plurality of places including the point at which the liquid refrigerant enters the tube and means for varying the passage of vaporized refrigerant counter to the flow of liquid refrigerant, said last means including a member for collecting unvaporized refrigerant to serve as a vapor block.

6. In an absorption refrigeration system, an evaporator having a first opening for the introduction of liquid refrigerant into the evaporator and a second opening remote from said first opening, said openings permitting the passage of refrigerant in vapor form from the evaporator, means associated with said second opening, responsive to the presence of unvaporized refrigerant for obstructing passage of vapor from the second opening thereby creating increased vapor flow through the first opening, said means including a perforated member extending across said second opening, said member being adapted to support liquid refrigerant in film form to obstruct the flow of vapor through said second opening.

7. In an absorption refrigeration system, an evaporator having a first opening for the introduction of liquid refrigerant into the evaporator and a second opening remote from said first opening, said openings permitting passage of refrigerant in vapor form from the evaporator, means associated with said second opening, responsive to the presence of unvaporized refrigerant for obstructing the passage of vapor from the second opening thereby creating increased vapor flow through the first opening, said means including a screen placed over said second opening whereby liquid refrigerant in film for collects thereon to obstruct passage of the vapor through said second opening.

8. An evaporator including at least one tube having two openings therein, means for supplying liquid refrigerant to the tube through the first of said openings so that refrigerant evaporated in said tube is free to flow from said tube through both of said openings, and means operative in response to a predetermined amount of unvaporized refrigerant for restricting the second of said openings, thereby increasing flow of evaporated refrigerant through the first opening to increase resistance to the supply of liquid refrigerant to the tube.

9. An evaporator including at least one member adapted to receive refrigerant in liquid form and release it in vapor form, means for supplying liquid refrigerant to the member in opposition to a portion of the vapor flowing form the evaporator and means for regulating the volume of vapor flowing in a direction opposed to the direction of flow of liquid refrigerant into the tube, said last mentioned means including a member for collecting unvaporized refrigerant to serve as an obstruction to the passage of vapor from the member except at the point where it flows in opposition to the flow of liquid refrigerant.

References Cited in the file of this patent

UNITED STATES PATENTS

| | | |
|---|---|---|
| 1,746,406 | Sawyer | Feb. 11, 1930 |
| 2,210,609 | Ullstrand | Aug. 6, 1940 |
| 2,317,234 | Thomas | Apr. 20, 1943 |
| 2,408,480 | Reid | Oct. 1, 1946 |
| 2,465,873 | Hibbs | Mar. 29, 1949 |
| 2,517,654 | Gaugler | Aug. 8, 1950 |

UNITED STATES PATENT OFFICE
CERTIFICATE OF CORRECTION

Patent No. 2,833,125                                                        May 6, 1958

Richard A. Sturley

It is hereby certified that error appears in the printed specification of the above numbered patent requiring correction and that the said Letters Patent should read as corrected below.

Column 2, line 10, for "evchange" read -- exchange --; line 19, for "and", second occurrence, read -- the --; column 5, line 3, for "for" read -- form --; column 6, line 2, for "form" read -- from --.

Signed and sealed this 15th day of July 1958.

(SEAL)
Attest:

KARL H. AXLINE
Attesting Officer

ROBERT C. WATSON
Commissioner of Patents